US008738226B2

(12) United States Patent
Troy et al.

(10) Patent No.: US 8,738,226 B2
(45) Date of Patent: May 27, 2014

(54) HOLONOMIC MOTION VEHICLE FOR TRAVEL ON NON-LEVEL SURFACES

(75) Inventors: James J. Troy, Issaquah, WA (US); Scott W. Lea, Renton, WA (US); Gary E. Georgeson, Federal Way, WA (US); Karl Edward Nelson, Shoreline, WA (US); Charles M. Richards, Kent, WA (US)

(73) Assignee: The Boeing Company, Chicago, IL (US)

( * ) Notice: Subject to any disclaimer, the term of this patent is extended or adjusted under 35 U.S.C. 154(b) by 465 days.

(21) Appl. No.: 13/210,899

(22) Filed: Aug. 16, 2011

(65) Prior Publication Data

US 2013/0024067 A1    Jan. 24, 2013

Related U.S. Application Data

(60) Provisional application No. 61/509,098, filed on Jul. 18, 2011.

(51) Int. Cl.
*G06F 7/00* (2006.01)
*G05D 1/00* (2006.01)

(52) U.S. Cl.
USPC ................................................. 701/36; 701/1

(58) Field of Classification Search
None
See application file for complete search history.

(56) References Cited

U.S. PATENT DOCUMENTS

| 5,890,553 | A | * | 4/1999 | Bar-Cohen et al. ............ 180/8.1 |
| 7,643,893 | B2 | | 1/2010 | Troy et al. |
| 7,859,655 | B2 | | 12/2010 | Troy et al. |
| 8,347,746 | B2 | * | 1/2013 | Hafenrichter et al. ....... 73/866.5 |
| 2003/0048081 | A1 | | 3/2003 | Seemann |
| 2009/0086014 | A1 | | 4/2009 | Lea et al. |
| 2010/0085437 | A1 | | 4/2010 | Troy et al. |
| 2011/0131976 | A1 | * | 6/2011 | Kratschmer et al. ............ 60/602 |

FOREIGN PATENT DOCUMENTS

JP         10249296 A     9/1998

OTHER PUBLICATIONS

Hillenbrand et al.: "CROMSCI: Development of a Climbing Robot with Negative Pressure Adhesion for Inspections", MCB University Press, Jan. 31, 2008, pp. 1-21 (Retrieved from the Internet: URL:http://agrosy.informatik.uni-kl.de/fileadmin/Literatur/Hillenbrand08.pdf).
Leon and Sattar: "Underwater Wall Climbing Robot for NDT Inspection", Robotics & NDT Automation, Nov. 3, 2010 (Retrieved from the Internet: URL:http://robotics.umng.edu.co/11.swf).
International Search Report and Written Opinion, Nov. 19, 2012, International application No. PCT/US2012/038563.
Unpublished U.S. Appl. No. 12/561,544, Troy, "Local Coordinate Motion Control for LPS Device Using Jacobian Matrices."
Unpublished U.S. Appl. No. 13/160,238, Troy et al., "Autonomous Non-Destructive Evaluation System for Aircraft Structures."

(Continued)

*Primary Examiner* — Ian Jen
(74) *Attorney, Agent, or Firm* — Ostrager Chong Flaherty & Broitman P.C.

(57) ABSTRACT

Holonomic-motion ground vehicles (i.e., mobile platforms) that are capable of controlled movement across non-level surfaces, while carrying one or more non-destructive inspection sensors or other tools. The mobile platform comprises a frame having four (or a multiple of four) Mecanum wheels, each wheel driven by a respective independently controlled motor, and further having a plurality (e.g., two) of independently controlled suction devices. The Mecanum wheels enable holonomic motion, while the suction devices facilitate sufficiently precise control of motion on non-level surfaces.

20 Claims, 12 Drawing Sheets

(56) References Cited

OTHER PUBLICATIONS http://www.clarifyingtech.com/public/robots/robots_public.html. Clarifying Vortex Attractor—Multi-Surface Attachment Device brochure (2004).

Ackerman, "Robot Uses Supersonic Jets of Air to Stick to Almost Anything," May 24, 2011.

Magare et al., "Vertical and Horizontal Surface Traversing Robot: Design Approach," NITJ-INDIA, CPIE—Mar. 22-24, 2007.

* cited by examiner

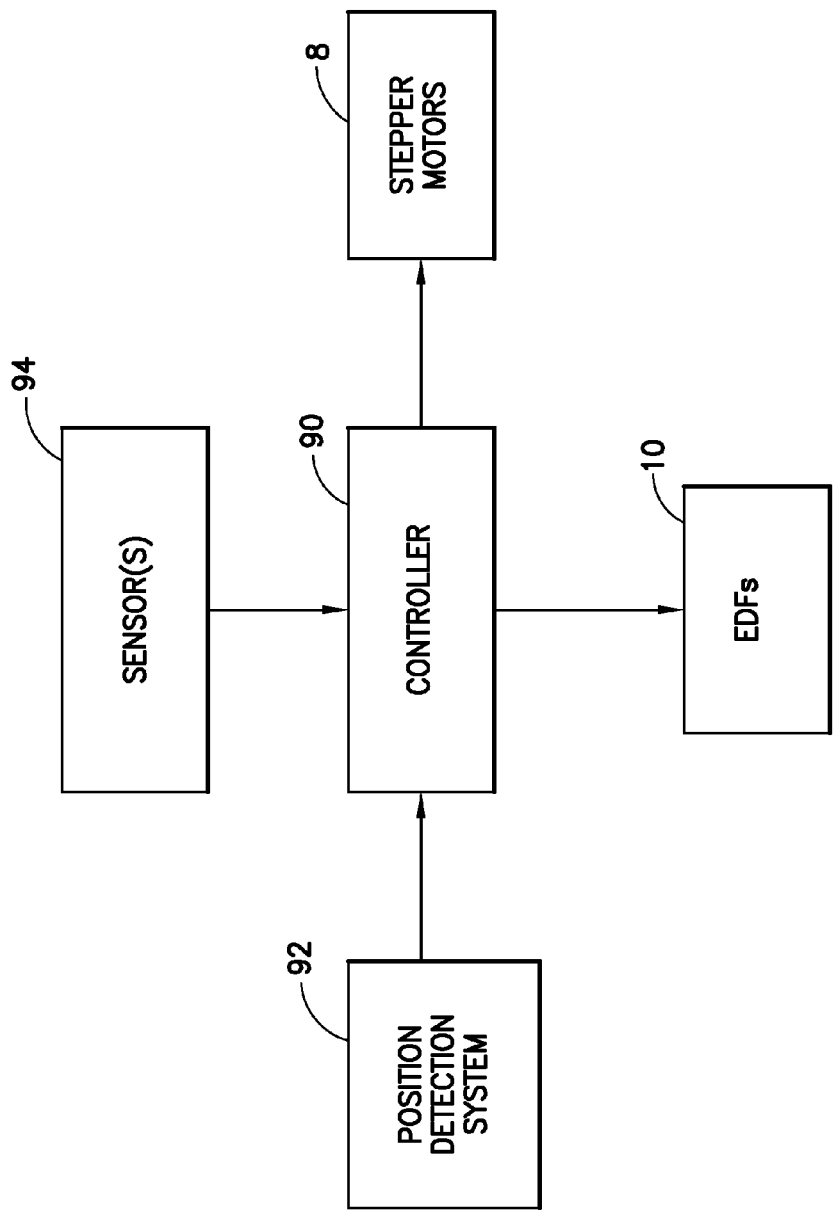

HOLONOMIC MOTION VEHICLE FOR TRAVEL ON NON-LEVEL SURFACES

RELATED PATENT APPLICATION

This application claims the benefit, under Title 35, United States Code, §119(e), of U.S. Provisional Application No. 61/509,098 filed on Jul. 18, 2011.

BACKGROUND

This disclosure generally relates to systems for carrying tools across surfaces, such tools including (but not limited to) sensors used in nondestructive evaluation (NDE). In particular, this disclosure relates to tool-carrying crawler vehicles that are capable of operating on a non-level surface.

Prior art systems for inspecting a non-level surface, such as the surface of an aircraft fuselage, include track-based systems, large robotic manipulator arms to position the tool, hand-held scanners and differential-drive crawler vehicles. The term "differential drive" refers to a type of vehicle motion control that makes turns by independently driving the wheels on opposite sides of the vehicle. In vehicles with four or more wheels, this type of motion control is sometimes called skid steer. Such vehicles are subject to motion constraints (i.e., they do not allow simultaneous translation and rotation) and are considered to be non-holonomic-motion systems.

It is known to use a non-holonomic-motion crawler vehicle to position and move NDE (nondestructive evaluation) scanning equipment on an aircraft fuselage. The scanning process requires precise position and orientation control in order to achieve the desired scanning path. Standard differential-drive vehicles will tend to slip sideways slightly when external forces are applied perpendicularly to the direction of travel. In the case where a surface of an airplane fuselage is being scanned, the vehicle needs to be attracted to the surface—usually with some type of suction or vacuum creation system. As the vehicle moves horizontally on and across the side of the fuselage, the external force of gravity pulls on the vehicle, causing it to slip sideways. Since a differential steer vehicle cannot directly control sideways motion, NDE scans acquired with that type of vehicle (i.e., a non-holonomic platform) can be distorted.

If a holonomic vehicle were to be used instead, any undesired motion could be corrected directly. The most common type of holonomic vehicle configuration uses a type of wheel called a Mecanum wheel. A Mecanum wheel is a type of wheel with multiple individual rollers that, when used in pairs, allows vehicle motion in any direction (i.e., holonomic motion). While these wheels work well on level surfaces, they have trouble creating the desired motion on inclined surfaces. This problem is due to the requirement that all wheels have sufficient traction on each wheel to support the forces required to make the desired movement. This is especially true of sideway motions.

There is a need for a system that enables precise control of the holonomic motion of a tool-carrying vehicle on a non-level surface.

SUMMARY

The embodiments disclosed herein are holonomic-motion ground vehicles (i.e., mobile platforms) that are capable of operating in horizontal and vertical configurations, while carrying one or more non-destructive inspection sensors or other tools. The mobile platform disclosed herein comprises a frame having four (or a multiple of four) Mecanum wheels, each wheel driven by a respective independently controlled motor, and further having a plurality (e.g., two) of independently controlled suction devices. The Mecanum wheels enable holonomic motion, while the suction devices facilitate sufficiently precise control of motion on non-level surfaces.

A holonomic system is one that is not subject to motion constraints. As used in this disclosure, a vehicle is considered to be holonomic if the controllable degrees of freedom are equal to the total degrees of freedom. This type of system can translate in any direction while simultaneously rotating. This is different than most types of ground vehicles, such as car-like vehicles, tracked vehicles, or wheeled differential-steer (skid-steer) vehicles, which cannot translate in any direction while rotating at the same time.

Holonomic-motion vehicles exist that can move on horizontal surfaces, and differential-steer vehicles exist that can climb vertical surfaces. The vehicles disclosed herein combine both of these capabilities. They achieve this combination of capabilities by using a suction generation system that equalizes or evenly distributes the normal loads on the Mecanum wheels so that the lateral forces needed by the wheels can be generated. The motion of the resulting platform can be controlled to enable general-purpose positioning for non-destructive scanning and other precise motion control tasks.

One aspect of the invention is a movable platform comprising: a frame comprising first and second openings, and first and second bottom surfaces that partly define first and second suction zones respectively; a plurality of wheels rotatably mounted to the frame, each wheel comprising a respective plurality of rollers having axes of rotation not parallel to an axis of rotation of the wheel; a plurality of motors equal in number to the number of wheels, each motor being operable to drive rotation of a respective one of the wheels; and first and second controllable suction devices respectively mounted adjacent to the first and second openings for producing respective suction forces in the first and second suction zones when the wheels are all in contact with a surface.

Another aspect of the invention is a system for moving a tool or sensor over a non-level surface, comprising a platform and a controller. The platform comprises: a frame comprising first and second openings, and first and second bottom surfaces that partly define first and second suction zones respectively; a plurality of wheels rotatably mounted to the frame, each wheel comprising a respective plurality of rollers having axes of rotation not parallel to an axis of rotation of the wheel; a plurality of motors equal in number to the number of wheels, each motor being operable to drive rotation of a respective one of the wheels; and first and second controllable suction devices respectively mounted adjacent to the first and second openings for producing respective suction forces in the first and second suction zones when the wheels are all in contact with the non-level surface. The controller is programmed to independently control the plurality of motors and the first and second suction devices.

A further aspect of the invention is a method for scanning a tool or sensor across a non-level surface of a structure, comprising: (a) placing the wheels of a tool- or sensor-carrying holonomic motion vehicle in contact with a non-level surface to be scanned; (b) producing suction forces which hold the wheels of the holonomic motion vehicle in contact with the non-level surface; (c) activating the tool or sensor while step (b) is being performed; and (d) controlling the rotation of the wheels to cause the vehicle to move along a path relative to the non-level surface while steps (b) and (c) are being performed.

Other aspects of the invention are disclosed below.

BRIEF DESCRIPTION OF THE DRAWINGS

FIG. 15 is a block diagram showing a system for controlling movement of a holonomic motion crawler vehicle over a non-level surface in accordance with a further embodiment.

Reference will hereinafter be made to the drawings in which similar elements in different drawings bear the same reference numerals.

DETAILED DESCRIPTION

Various embodiments of a crawler vehicle capable of traveling on a non-level surface will now be disclosed. The vehicles disclosed each comprise a platform that has four Mecanum wheels and a suction or vacuum creation system for holding the platform with sufficient traction against a surface. However, the platform may have any multiple of four Mecanum wheel, e.g., 4, 8, 12, etc. While certain disclosed embodiments carry one or more non-destructive inspection sensors for inspecting the surface on which the vehicle travels, the embodiments disclosed herein can alternatively carry other types of tools, such as tools needed in maintenance or painting operations.

A Mecanum-wheeled vehicle is a holonomic system, meaning that it can move in any direction while simultaneously rotating. This is possible because of the shape of the wheels. The standard configuration for a Mecanum-wheeled vehicle has four Mecanum wheels (two type "A" and two type "B"). The Mecanum wheels are arranged with the "A" pair on one diagonal and the "B" pair on the other, with each having its axle perpendicular to a line running through the center of the vehicle. The axes of the rollers on the type "A" Mecanum wheels are at right angles to the axes of the rollers on the type "B" Mecanum wheels Such a Mecanum-wheeled vehicle can be made to move in any direction and turn by varying the speed and direction of rotation of each wheel. For example, rotating all four wheels in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

Figure 1:
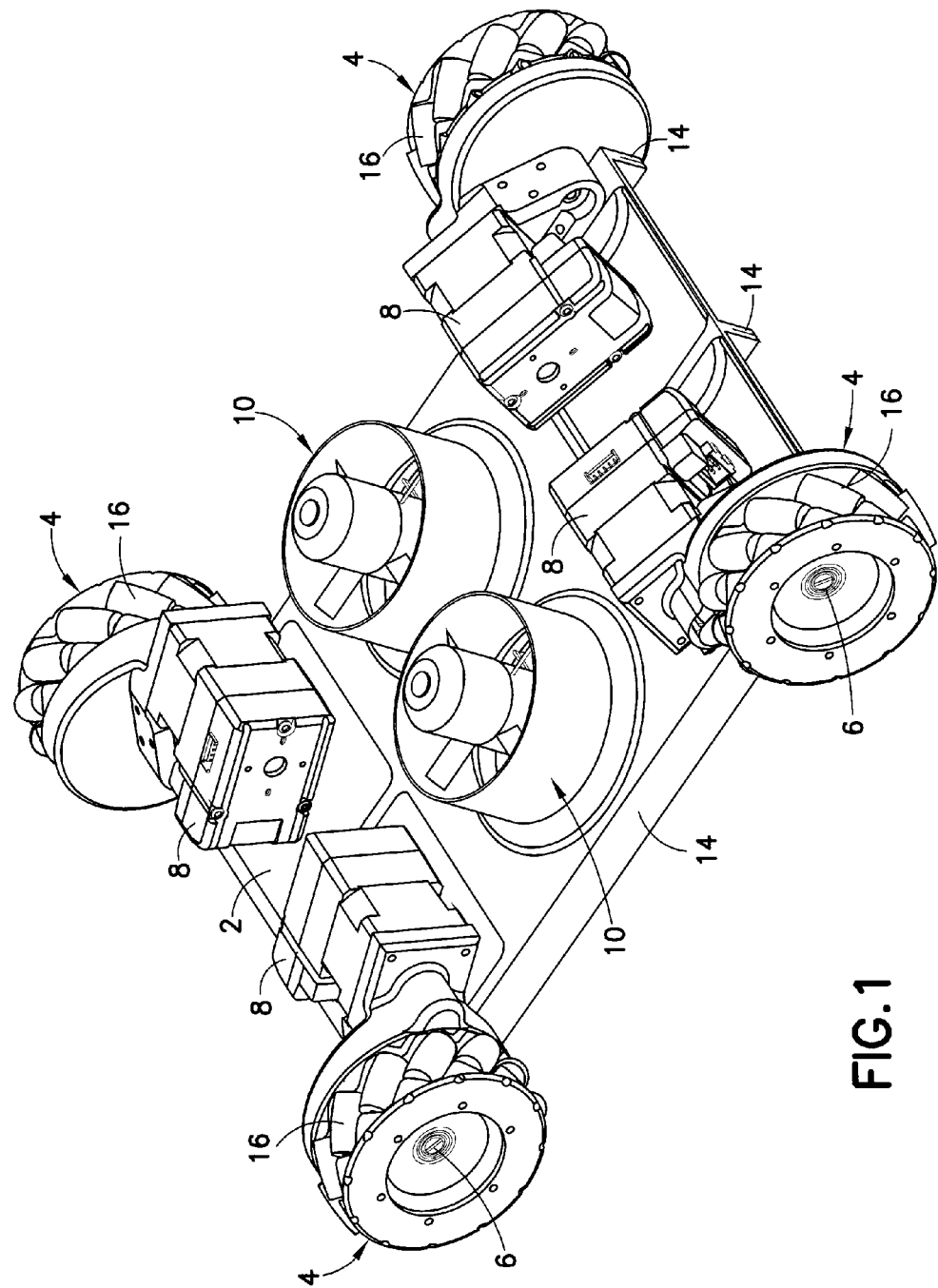
FIG. 1 is a diagram representing an isometric view of parts of a holonomic-motion crawler vehicle having two suction zones in accordance with one embodiment. The electrical connections for supplying signals for controlling operation of the depicted components and other components are not shown.

FIG. 1 shows parts of a holonomic-motion crawler vehicle having four Mecanum wheels and two suction zones in accordance with one embodiment. The electrical connections for supplying signals for controlling operation of the depicted components are not shown. This holonomic-motion platform comprises a frame 2 with four Mecanum wheels 4 (two type "A" and two type "B") mounted to the frame by means of respective axles 6, and further comprises four independently controlled stepper motors 8 (one per wheel). The Mecanum wheels 4 are arranged with the "A" pair on one diagonal and the "B" pair on the other, with each having its axle 6 perpendicular to a line running through the center of the vehicle. Each stepper motor 8 controls the rotation of a respective wheel 4.

The embodiment depicted in FIG. 1 also has two suction devices 10 arranged side by side in the middle of the frame 2, midway between the front and rear wheels. In this particular embodiment, each suction device is a respective electric ducted fan which is mounted in a respective opening (not shown in FIG. 1) formed in the frame. Each electric ducted fan 10 comprises a fan which is rotatable about an axis, a duct surrounding the fan, and an electric motor which drives the fan to rotate in a direction such that air is propelled from a respective channel or space underneath the frame (hereinafter "suction zone") up through the fan duct, thereby creating suction in the corresponding suction zone. Although the disclosed embodiments have a perpendicular fan axis, a perpendicular mounting is not critical to the design. Suction can still be generated if the fan were mounted in other ways, e.g., with a curved duct to channel the air input to the fan from under the vehicle. The current configuration wherein the fan axis is normal to the frame was mainly chosen for convenience of mounting the fans. Although the fans in this configuration provide some propulsion thrust that assists in keeping the vehicle in contact with the surface, the amount of this thrust is small when compared to the suction force that the fans and suction zones generate under the vehicle.

The two suction zones are bounded on opposing sides by longitudinal low-surface-friction flexible skirts 14 which are attached to the frame 2, the middle skirt forming a common boundary wall separating the two suction zones. The skirts may extend downward so that their bottom edges contact the surface on which the vehicle is moving.

Although not shown in FIG. 1, the crawler vehicle can be tethered to a support system by a cable which supplies electrical power to the stepper motors 8 and electric ducted fans 10 on the vehicle. The cable also provides control signals from a controller (e.g., a computer) which controls the operation of the stepper motors and electric ducted fans. The crawler vehicle further comprises a converter box (not shown) mounted to the frame 2. The converter box converts USB signals from the controller (not shown) into pulse-width-modulated (PWM) signals for controlling the electric ducted fan motors.

In accordance with an alternative embodiment, the crawler vehicle could be battery-powered, instead of receiving electrical power via the tether cable. Also the motor controller could be a microprocessor or microcomputer mounted onboard the crawler vehicle, rather than using a ground-based computer to control the vehicle by means of controls signals carried by a tether cable. Alternatively, the motors onboard the crawler vehicle can be controlled via a wireless connection to an off-board controller.

The crawler vehicle shown in FIG. 1 utilizes four Mecanum wheels. Each Mecanum wheel 4 has a multiplicity of tapered rollers 16 rotatably mounted to its circumference, each roller being freely rotatable about its axis. These rollers have an axis of rotation which lies at a 45° angle with respect to the plane of the wheel. Type "A" Mecanum wheels have left-handed rollers, while Type "B" Mecanum wheels have right-handed rollers. The vehicle can be made to move in any direction and turn by varying the speed and direction of rotation of each wheel.

Figure 2:
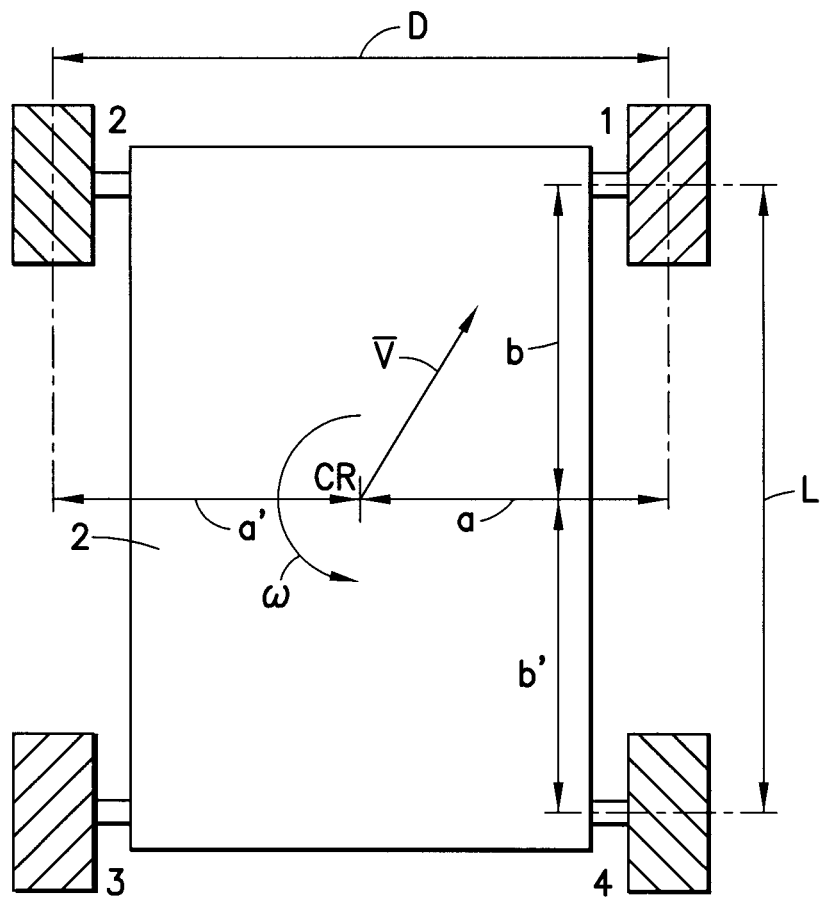
FIG. 2 is a diagram showing input parameters in relation to the Mecanum-wheeled frame of the assembly depicted in FIG. 1.

From the perspective of navigation control (either by computer control or human teleoperation control), the inputs to the system are a motion direction vector $\vec{V}$ (with components $v_{ty}$ and $v_{tx}$) and a rotational rate $\omega$, as shown in FIG. 2. Equations (1)-(6) (see below) use the $\vec{V}$ and $\omega$ variables as inputs to produce the required wheel rotational rates, where $v_{wn}$ is the individual wheel velocity (where n is an integer from 1 to 4, indicating the n-th of four wheels), and D and L are vehicle dimensions that define the locations of the centers of the wheels on the vehicle. The variables a and b are user-controlled, independent variables that can be modified at run-time to specify the center of rotation CR. (Note, in FIG. 2, the center of rotation is shown at the center of the vehicle, but it can be specified by the user to be anywhere.)

$$v_{w1} = v_{ty} - v_{tx} + \omega(a+b) \quad (1)$$

$$v_{w2} = v_{ty} + v_{tx} - \omega(a'+b) \quad (2)$$

$$v_{w3} = v_{ty} - v_{tx} - \omega(a'+b') \quad (3)$$

$$v_{w4} = v_{ty} + v_{tx} + \omega(a+b') \quad (4)$$

$$a' = D - a \quad (5)$$

$$b' = L - b \quad (6)$$

The frame 2 of the vehicle requires some amount of compliance to keep all of the wheels in contact with a surface without slipping. If only three of the four wheels are in contact with the surface and can generate traction, the vehicle will not respond properly to motion inputs. One way to address the wheel contact issue is to build a frame with low torsional stiffness. Another way is to provide suspension for one or more of the wheels. For a Mecanum-wheeled vehicle to function properly on inclined, vertical or inverted surfaces, there are additional issues that need to be addressed. Specifically, in order to generate the proper vehicle motion, the forces on the wheels need to be sufficient to generate the required traction. If one or more of the wheels begin to slip or stall, the required forces at that corner of the vehicle will not be produced, resulting in an undesired overall vehicle motion.

To solve this problem, the crawler vehicles disclosed herein are provided with multiple suction or vacuum creation devices attached to respective openings in the frame to create suction zones that can be controlled independently. These independently controlled suction zones allow the system to control the amount of force exerted on the wheels by the contacting surface.

Figure 3:
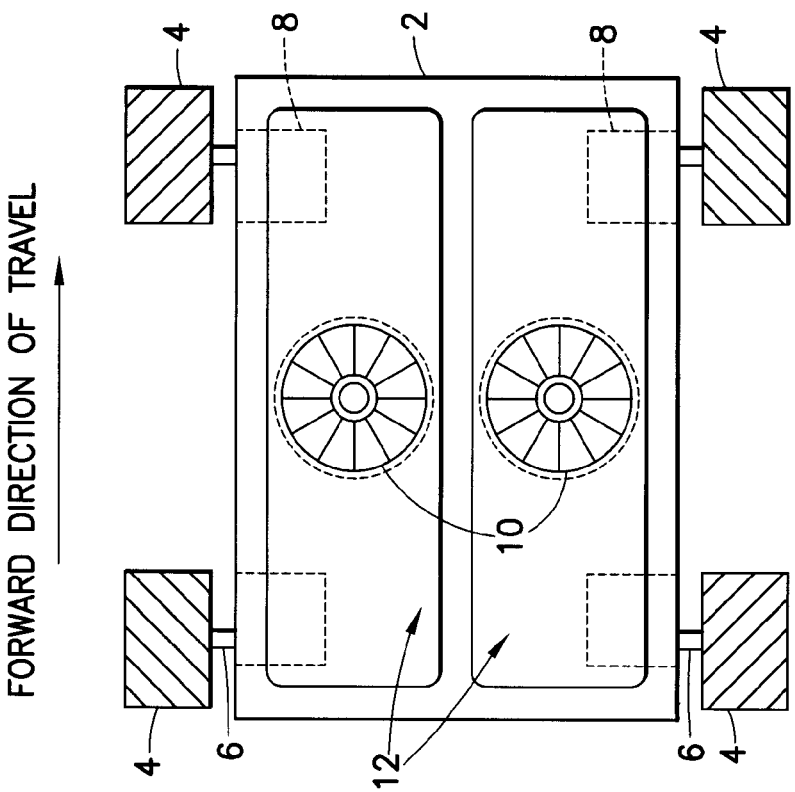
FIG. 3 is a diagram representing a bottom view of a crawler vehicle having two suction zones in accordance with the embodiment depicted in FIG. 1.

FIG. 3 shows a bottom view of the crawler vehicle depicted in FIG. 1. The underside of the frame 2 is shaped to provide two low-pressure regions 12 (referred to herein as "suction zones"), and has low-surface-friction skirts (previously described and not shown in FIG. 3) that conform to non-flat surfaces. Each electric ducted fan 10 is installed in a respective opening in the frame and is in fluid communication with a respective suction zone 12 defined by the frame bottom surface and the skirts. When the fans 10 are turned on, each fan propels air upward, thereby sucking air from the shaped suction zones 12. The electric ducted fans 10 can be independently controlled to apply different suction forces to the surface underneath the respective suction zones 12.

Figure 4:
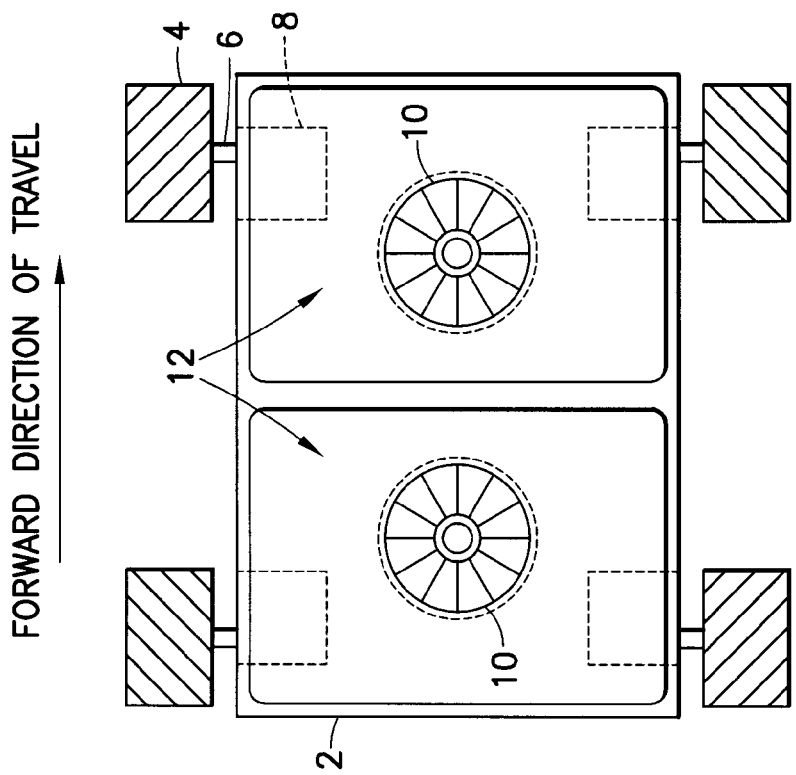
FIG. 4 is a diagram representing a bottom view of a crawler vehicle having two suction zones in accordance with an alternative embodiment.

In accordance with an alternative embodiment shown in FIG. 4, the suction zones 12 are not side by side under the frame but rather, one is forward of the other. This design provides a crawler vehicle best suited for scanning vertically, whereas the suction zone configuration shown in FIG. 3 provides a crawler vehicle best suited for scanning horizontally.

The ability to control the suction in the various zones under the vehicle allows the load on the wheels in the direction perpendicular to the surface normal to be controlled, which in turn provides the ability to increase the lateral force on the wheels through the equation $F=\mu N$, where F is the lateral force, $\mu$ is the coefficient of friction, and N is the normal force.

If one were to construct a crawler vehicle having only a single suction zone powered by a single vacuum generation element (such as an electric ducted fan), the resulting forces exerted on the vehicle by an inclined surface would not be conducive to precisely controlled movement on that surface because the normal and lateral forces on the lower wheels would be much higher than the corresponding forces on the upper wheels. The resulting problem with such a system is that it does not move properly on inclined or vertical surfaces. The fan generates sufficient suction to hold the vehicle on the inclined surface, but since the system has only one suction zone, it creates unequal frictional forces and unequal normal forces on the wheels respectively located on the left- and right-hand sides of the vehicle. The wheels disposed at a higher elevation on the inclined surface always have more normal traction than the wheels disposed at a higher elevation.

A key insight is to recognize that non-equal wheel forces cause the foregoing motion control problem. To solve the problem required finding a way to balance the forces. The forces can be balanced by designing the crawler vehicle to include at least two suction zones 12, as shown in FIGS. 3 and 4.

Figure 5:
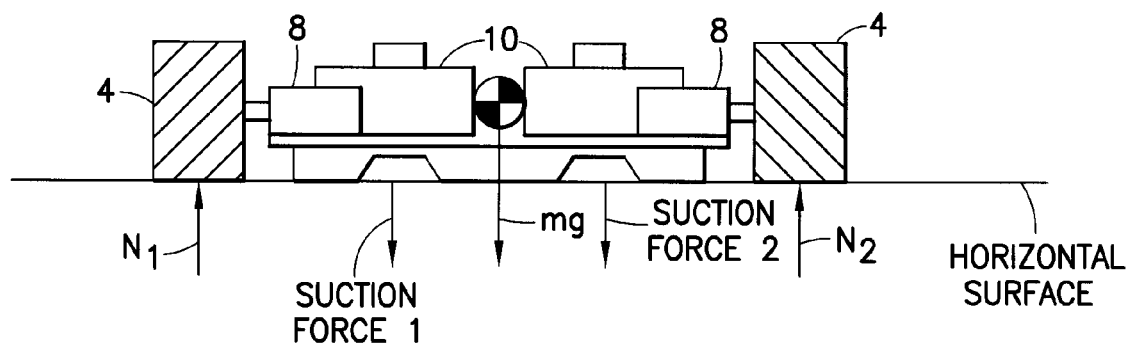
FIGS. 5 and 6 are diagram representing a front view of portions of a crawler vehicle that has multiple operating suction zones and further showing the forces exerted by a horizontal surface (see FIG. 5) and an inclined surface (see FIG. 6) on the Mecanum wheels of the crawler vehicle.

FIG. 5 is a diagram showing the forces exerted by a horizontal surface on the Mecanum wheels 4 of the crawler vehicle depicted in FIG. 3. When the suction forces generated by the respective electric ducted fans 10 are equal, the normal forces on the Mecanum wheels 4 on the left- and right-hand sides of the vehicle are equal, i.e., $N_1 = N_2$.

Figure 6:
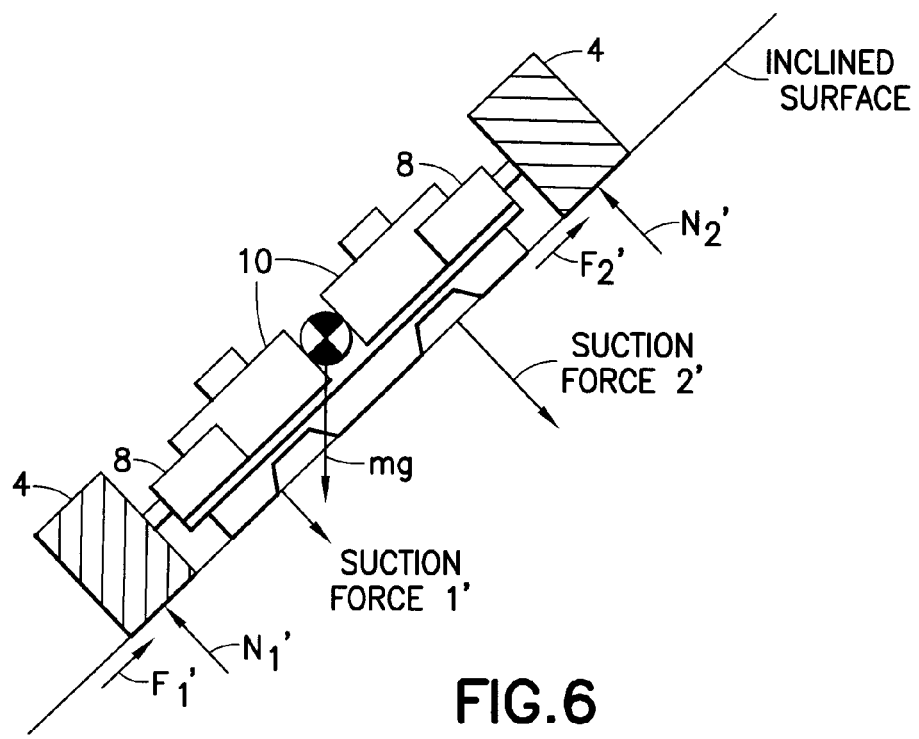

FIG. 6 is a diagram showing the forces exerted by an inclined surface on the Mecanum wheels 4 of the crawler vehicle depicted in FIG. 3. The speed of the electric ducted fans 10 can be controlled to produce different suction forces in their respective suction zones 12. When the suction force generated by the electric ducted fan disposed at a relatively higher elevation is greater by a certain amount than the suction force generated by the electric ducted fan disposed at a relatively lower elevation, the frictional and normal forces exerted by the inclined surface on the Mecanum wheels 4 on the left- and right-hand sides of the vehicle can be equalized, i.e., $F'_1=F'_2$ and $N'_1=N'_2$. Thus the suction in the upper zone can be increased relative to that of the lower zone, resulting in an increase in the normal load on the upper wheels. The respective electric ducted fans 10 are controlled as a function of the angle of inclination of the non-level surface on which the vehicle is situated. The balance between the zones 12 can be controlled by using a sensor (not shown), such as an electronic inclinometer sensor, installed on the frame 2 to measure the relative angle between the frame and the gravity vector mg. The electronic inclinometer sensor returns angle of inclination data to the controller, which uses the data for controlling the electric ducted fans.

Figure 11:
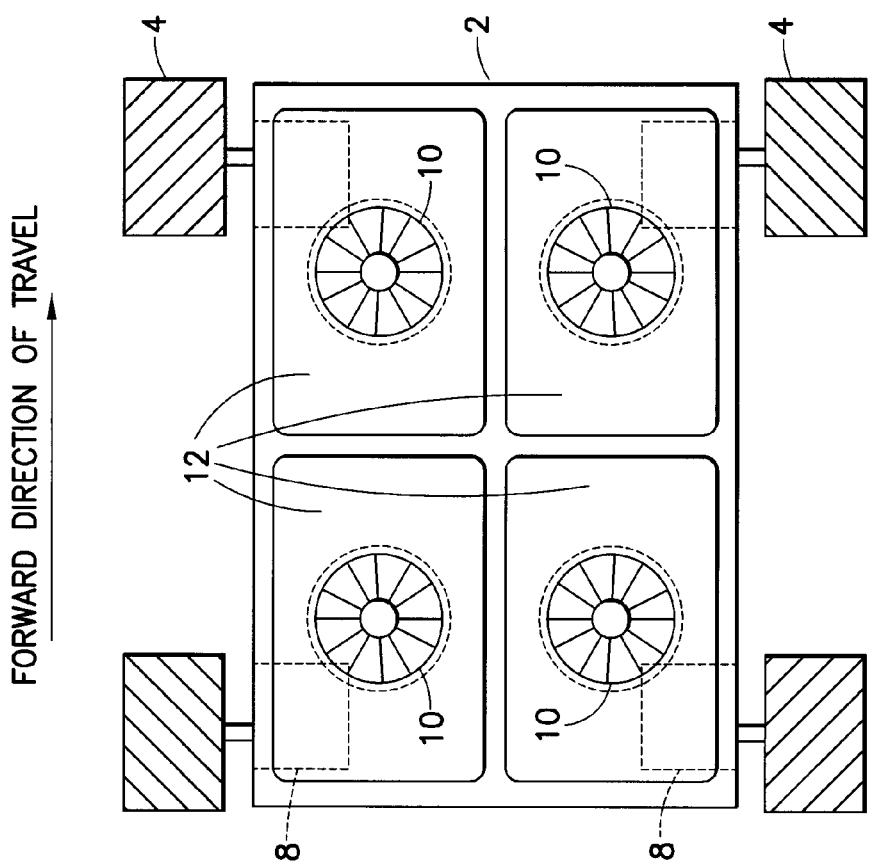
FIG. 11 is a diagram representing a bottom view of a crawler vehicle having four suction zones.

The embodiments shown in FIGS. 1 and 3 have two independently controlled suction zones 12 wherein the suction is provided by electric ducted fans 10. Other suction generation devices may also be used. Furthermore, the vehicle can be provided with multiple pairs of left and right suction zones. For example, a square or rectangular array of four suction zones 12 may also be implemented if needed. Such an arrangement is depicted in FIG. 11.

Figure 7:
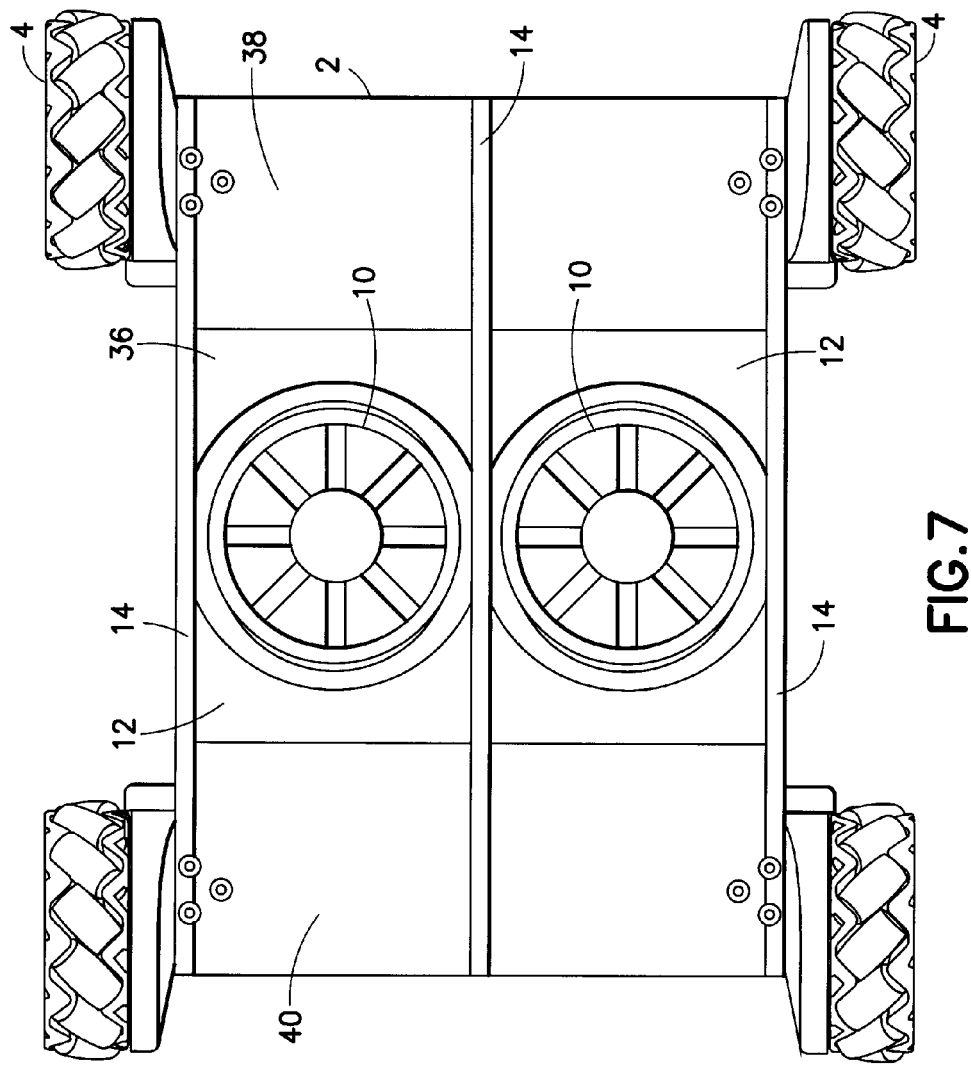
FIG. 7 is a diagram showing a top view of a prototype of a Mecanum-wheeled crawler vehicle having dual suction zones.

FIG. 7 show a bottom view of a prototype of a Mecanum-wheeled crawler vehicle having dual suction zones 12 separated by a common skirt 14 which bisects the bottom surface of the frame along a longitudinal axis. In this particular construction, the upper half of the bottom surface between the uppermost and middle skirts 14 comprises a flat central surface 36 having an opening in which the fan of the electric ducted fan is installed. This flat central surface 36 is flanked by forward and rearward convex surface 38 and 40. Each convex surface 38 and 40 may be an aerodynamically streamlined surface which forms a respective throat with opposing portions of the surface on which the vehicle is moving. Thus, the contoured bottom surface of the frame, the skirts and the surface on which the vehicle is moving define respective channels that allow sufficient air to be sucked up through the corresponding electric ducted fan to generate a desired suction force. The portion of each channel between the lowest points of the convex surfaces 38 and 40 forms a respective suction zone 12. In the particular embodiment depicted in FIG. 7, the suction zones are separated by the middle skirt and are in fluid communication with the respective openings in which the ducted fans are installed. These openings may be substantially conical along a lowermost portion thereof to facilitate the flow of air out the suction zone.

It should be appreciated that the under-body surface shape seen in FIG. 7 is an exemplary implementation. The under-body surface may have many different shapes conducive to the flow of air from the front and rear of the vehicle through the space underneath the vehicle and then up through the ducts of the electric ducted fans.

The system disclosed herein combines the directional control advantages of a Mecanum-wheeled platform with the ability to work on inclined, vertical or inverted surfaces. As compared to inspection systems that attach to the inspection surface, or systems that use a large robotic manipulator arm, a crawler vehicle has more flexibility in the types of regions that can be inspected, and is safer for operators and the object being inspected. The main advantage that the system disclosed herein has over other systems is the combination of the ability to hold the vehicle's position on any surface without sliding (due to the controlled suction system) and the ability to move in any direction (due to the holonomic-motion platform).

With a holonomic-motion system that can move on level, inclined and vertical surfaces (and potentially inverted surfaces), general-purpose motion control is enabled for inspection and other types of applications. For the types of inspection applications envisioned, having holonomic motion control, allows the system operator to use more efficient path planning as compared to standard non-holonomic vehicles that have Ackermann-type steering. Ackermann steering is a type of steering system found in vehicles such as cars for turning control, in which vectors extending from the axle of each wheel would intersect at the same point. This type of vehicle has non-holonomic motion.

Figure 8A:
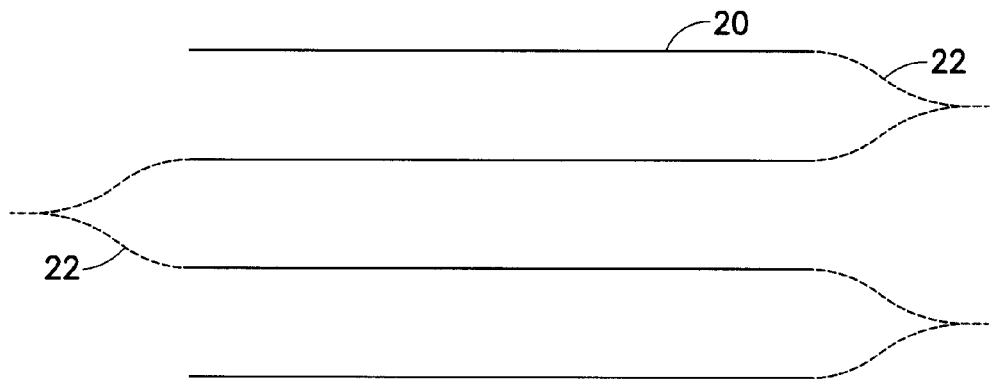
FIGS. 8A and 8B are diagrams showing respective paths for an Ackermann-steering vehicle in which a surface scan can take place in either direction (see FIG. 8A) and in which a surface scan in only one direction is allowed (see FIG. 8B).
Figure 8B:
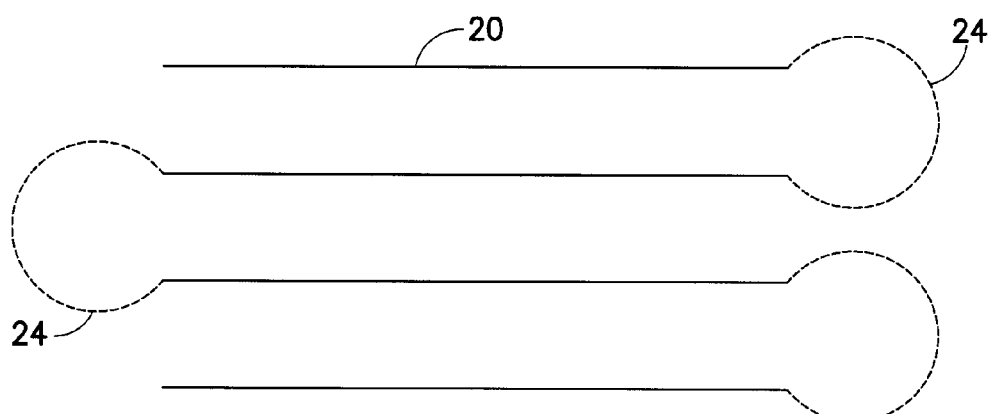
Figure 8C:
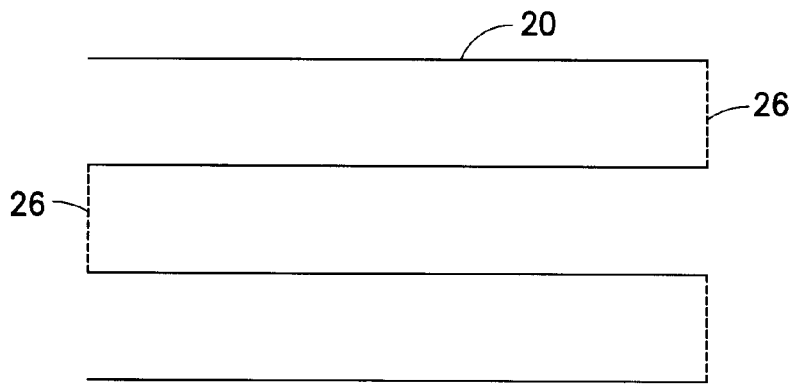
FIG. 8C is a diagram showing a path for a holonomic-motion vehicle in which a surface scan can be performed without additional lateral maneuvers at the end of each scanning path.

FIG. 8A shows a path for an Ackermann-steering vehicle in which a surface scan 20 can take place in either direction (i.e., the vehicle can move either forward or in reverse), while FIG. 8B shows the same vehicle when scanning in only one direction is allowed (i.e., the vehicle can move in a forward direction and not a reverse direction). In both of these cases, the vehicle needs to perform additional maneuvers (indicated by dashed lines 22 and 24 in FIGS. 8A and 8B respectively) at the end of the scanning path in order to get properly aligned for the next pass. In contrast, for the situation where the scanning can take place in either forward or reverse directions, a holonomic system can move directly from the end of one scan segment 20 to the start of the next via paths 26, as shown in FIG. 8C, by translating sideways. Holonomic vehicles can maintain the orientation of the attached NDI (non-destructive inspection) sensor relative to the inspection surface even as they change directions. This capability is advantageous, as inspection data can continue to be collected near structural edges; inspection time is not wasted when the vehicle changes direction for a new pass. Non-holonomic vehicles cannot translate sideways to make corrections to the path, which is important to controlling the shape of the path.

For the situation where only the forward scanning direction is allowed, a Mecanum-wheeled vehicle of a type disclosed herein could make each 180-degree turn indicated in FIG. 8C by controlling the vehicle to rotate 180 degrees while simultaneously translating in a downward direction (along path 26). Note that for a holonomic vehicle, motion directions can be defined using an external reference frame (e.g., "downward"), which can then be converted into vehicle-centric coordinates when the vehicle's position and orientation are tracked.

While making a rotation maneuver as described above on an inclined, vertical or inverted surface, the suction in the multiple zones under the Mecanum-wheeled vehicle will be automatically changed by the control software or hardware as the wheel loads in the normal direction change. The change in suction is performed in order to achieve balanced loads on the wheels. Suction in the various zones may also change as the vehicle moves over a curved surface. In some embodiments, the relative amounts of suction in each zone are controlled by using data from a gravity vector sensing device, such as an inclinometer. In other embodiments, load sensors for each wheel may be used to determine the required amount of suction.

Figure 9:
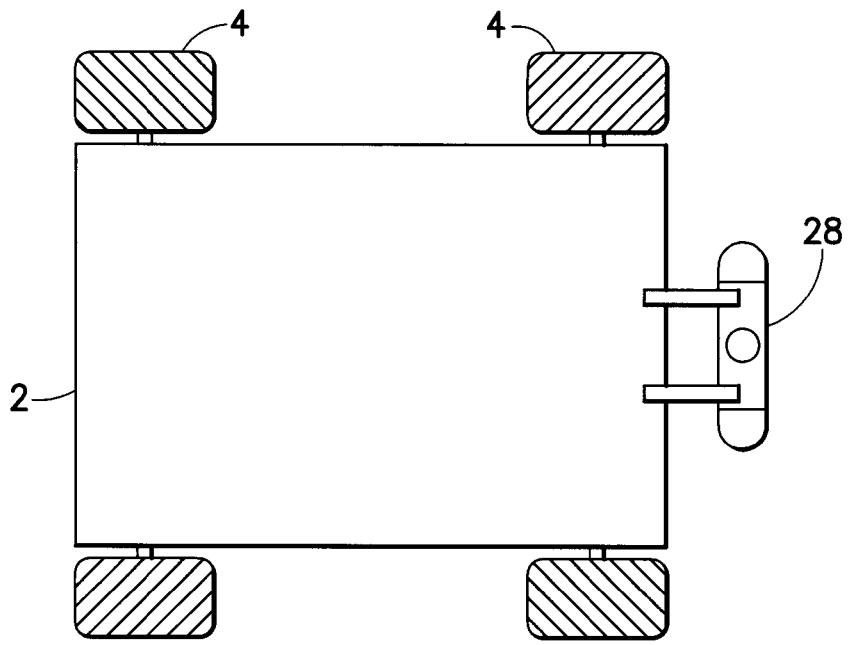
FIG. 9 is a diagram representing a top view of a Mecanum-wheeled frame of a crawler vehicle having a fixed NDE scanned head attached to one end thereof.
Figure 10:
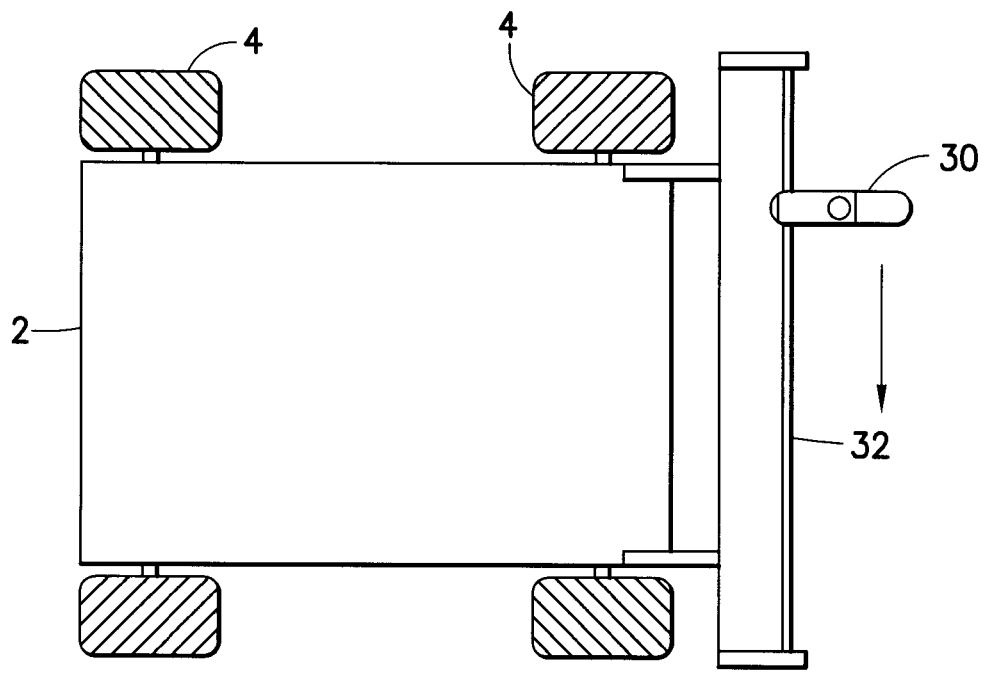
FIG. 10 is a diagram representing a top view of a Mecanum-wheeled frame of a crawler vehicle having a reciprocating NDE scanned head mounted to one end thereof.

The crawler vehicles disclosed herein have multiple applications. In accordance with one application, the crawler vehicle will carry an eddy-current sensor, but other types of sensors, such as ultrasonic sensors can be carried. The sensor may be a single sensing element or an array of sensing elements. Cameras, tools, painting equipment, a laser marking system, a robotic arm manipulator, or other devices could also be carried by the platform. FIG. 9 shows a version of the crawler vehicle with a fixed ultrasonic sensor unit 28 mounted to one end of the frame. The ultrasonic sensor unit 28 can scan an underlying surface in the direction in which the vehicle crawls. The ultrasonic sensor may be a single ultrasonic sensing element or an array of ultrasonic sensing elements. FIG. 10 shows another version of the crawler vehicle with a scanning ultrasonic sensor unit 30 mounted on a track 32 fixed to one end of the frame. The ultrasonic sensor unit 30 can slide back and forth along the track 32, scanning a transverse area of underlying surface while the vehicle is stationary. Again, the ultrasonic sensor may be a single sensing element or an array of sensing elements. The vehicle can be moved forward in increments, pausing after each incremental move to allow the ultrasonic sensor unit 30 to scan along a transverse line. Alternatively, a controller can be programmed to control the movements of the crawler vehicle and the scanning head to provide other patterns for scanning a surface area.

One target application for the vehicles disclosed herein is an airplane non-destructive inspection (NDI) system involving a crawler vehicle that moves over the airplane fuselage. The requirement for this system is to maintain a constant speed in a straight line as the vehicle moves front to back along the length of the fuselage. (This system is described in detail in U.S. patent application Ser. No. 13/160,238, the disclosure of which is incorporated by reference herein in its entirety.) The tracking system can be an off-board system, such as a beam-directed control system, an image-based tracking system or a motion capture system.

In the case of a beam-directed control system, a computer-controlled instrument aims a beam (laser) spot on a target surface of a beam receiver for control of position and orientation of the vehicle. A suitable beam-directed control system is the one described in U.S. patent application Ser. No. 13/206,269 (the disclosure of which is incorporated by reference herein in its entirety).

In accordance with another embodiment, the tracking system may be an image-based tracking system such as is described in U.S. Patent Application Publ. No. 2010/0085437 (the disclosure of which is incorporated by reference herein in its entirety), using a local positioning system of the type shown in FIG. 12.

Figure 12:
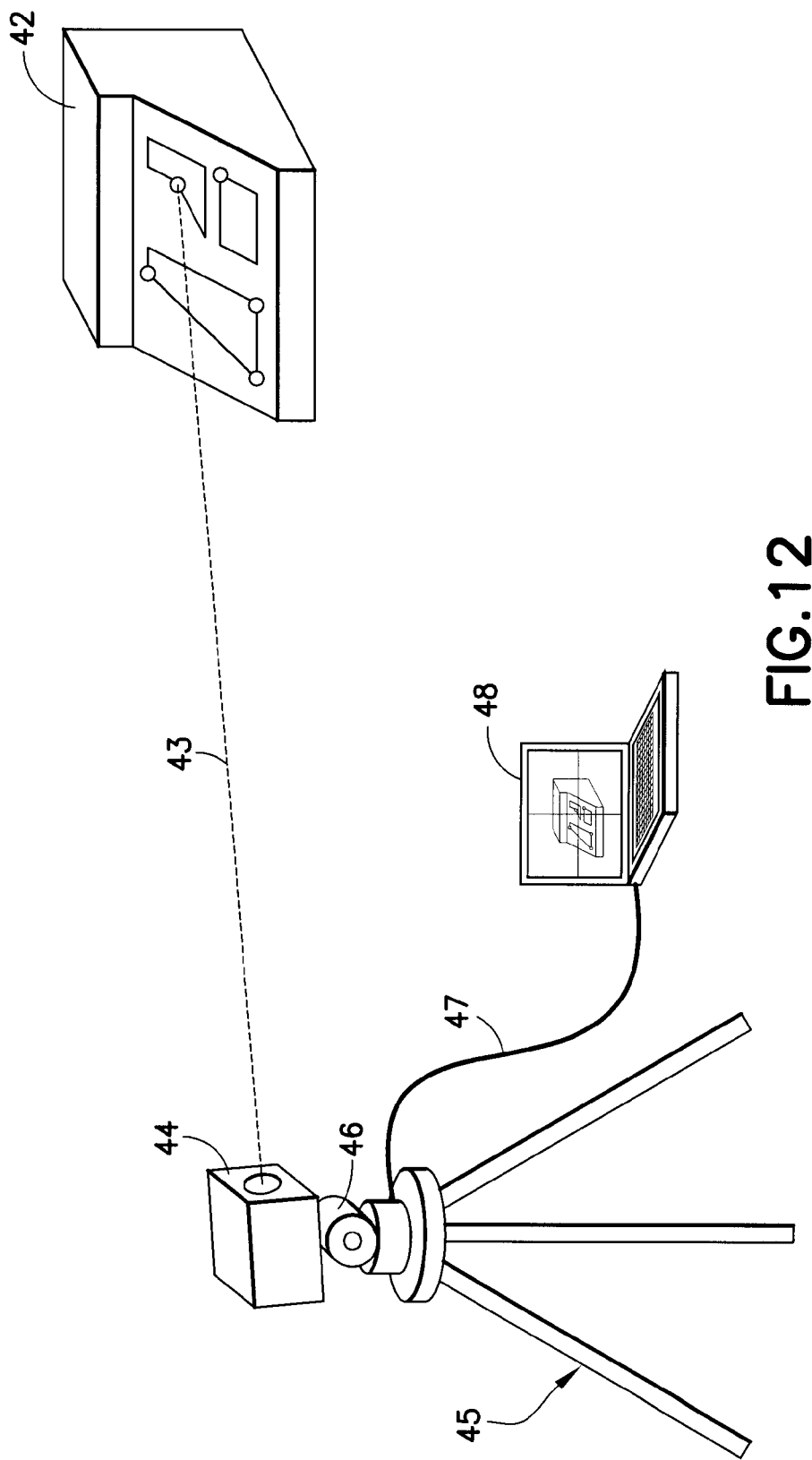
FIG. 12 is a diagram showing a schematic view of an image-based or laser-based system which is suitable for tracking a holonomic-motion crawler vehicle.

The local positioning system depicted in FIG. 12 comprises a video camera 44 which may have automated (remotely controlled) zoom capabilities. The video camera 44 may additionally include an integral crosshair generator to facilitate precise locating of a point within an optical image field display of the video camera. The video camera 44 is supported on a pan-tilt mechanism 46 which is controlled by a computer 48. The pan-tilt mechanism 46 is controlled to positionally adjust the video camera 44 to selected angles around a vertical, azimuth (pan) axis and a horizontal, elevation (tilt) axis. A direction vector that describes the orientation of the camera relative to the fixed coordinate system of the tripod 45 (or other platform on which the pan-tilt unit is attached) is determined from the azimuth and elevation angles, as well as the position of the center of crosshair marker in the optical field when the camera is aimed at a point of interest. This direction vector can be thought of as a line 43 extending from the lens of the camera and intersecting a location on target object 42. The local positioning system of FIG. 12 is described in U.S. Pat. No. 7,859,655 (the disclosure of which is incorporated by reference herein in its entirety).

The video camera 44 and the pan-tilt mechanism 46 may be operated by computer 48. The computer 48 communicates with the video camera 44 and the pan-tilt mechanism 46 through a video/control cable 47. Alternatively, the computer 48 may communicate with video camera 44 and pan-tilt mechanism 46 through a wireless communication pathway (not shown).

Three-dimensional (3-D) localization software may be loaded onto the computer 48. The 3-D localization software may use multiple calibration points at a distance on target object 42, such as a crawler vehicle, to define the location (position and orientation) of the video camera 44 relative to the target object 42. The calibration points may be used in coordination with the azimuth and elevation angles from the pan-tilt mechanism 46 to solve for the camera position and orientation relative to the target object 42.

A laser range meter (not shown) may be mounted on the camera 44 and aligned with the direction vector 43. The laser range meter is configured to measure distances to the target object 42, such as an inspection vehicle. The laser range meter may have a laser and a unit configured to compute distances based on the laser light detected in response to a laser beam reflected by the target object.

Once the position and orientation of the video camera 44 with respect to the target object 42 have been determined and a camera pose transformation matrix has been generated, camera pan data (angle of rotation of the video camera 44 about the azimuth axis) and tilt data (angle of rotation of the video camera 44 about the elevation axis) may be used in conjunction with the calculated position and orientation of the video camera 44 to determine the X, Y and Z coordinates of any point of interest on the target object 42 in the coordinate system of the target object.

Figure 13:
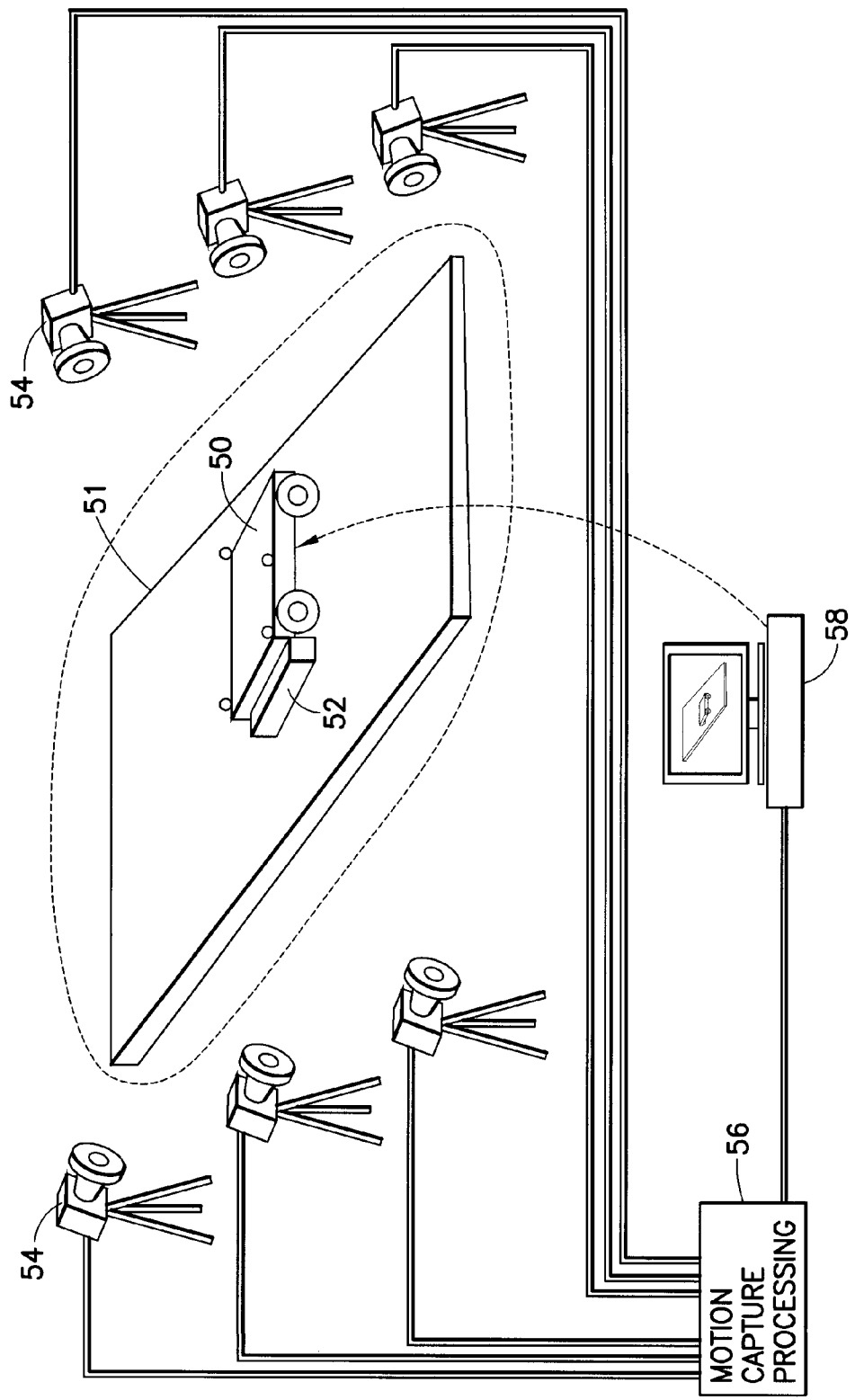
FIG. 13 is a diagram showing a schematic view of a motion capture system which is suitable for tracking a holonomic-motion crawler vehicle.

In accordance with a further alternative, the tracking system may be a motion capture system of the type described in U.S. Pat. No. 7,643,893 (the disclosure of which is incorporated by reference herein in its entirety) and shown in FIG. 13. Using such a motion capture system, a holonomic motion crawler vehicle 50 carrying an NDI sensor 52 and illuminators and retro-reflective markers (not shown) can be tracked using multiple off-board cameras 54 as it travels over a surface being inspected, e.g., a surface of a wing 51 of an airplane. The embodiment shown in FIG. 13 has a motion capture processor 56 which collects real-time image information from all instances of the motion capture cameras 54, processes the data, and sends the processed data along a dedicated or network connection to a crawler navigation and control computer 58. The position and orientation of the crawler vehicle 50 is controlled by the crawler navigation and control computer 58 via a wired or wireless control link (indicated by the dashed arrow), such control being a function of the processed data received from the motion capture processor 56.

Figure 14:
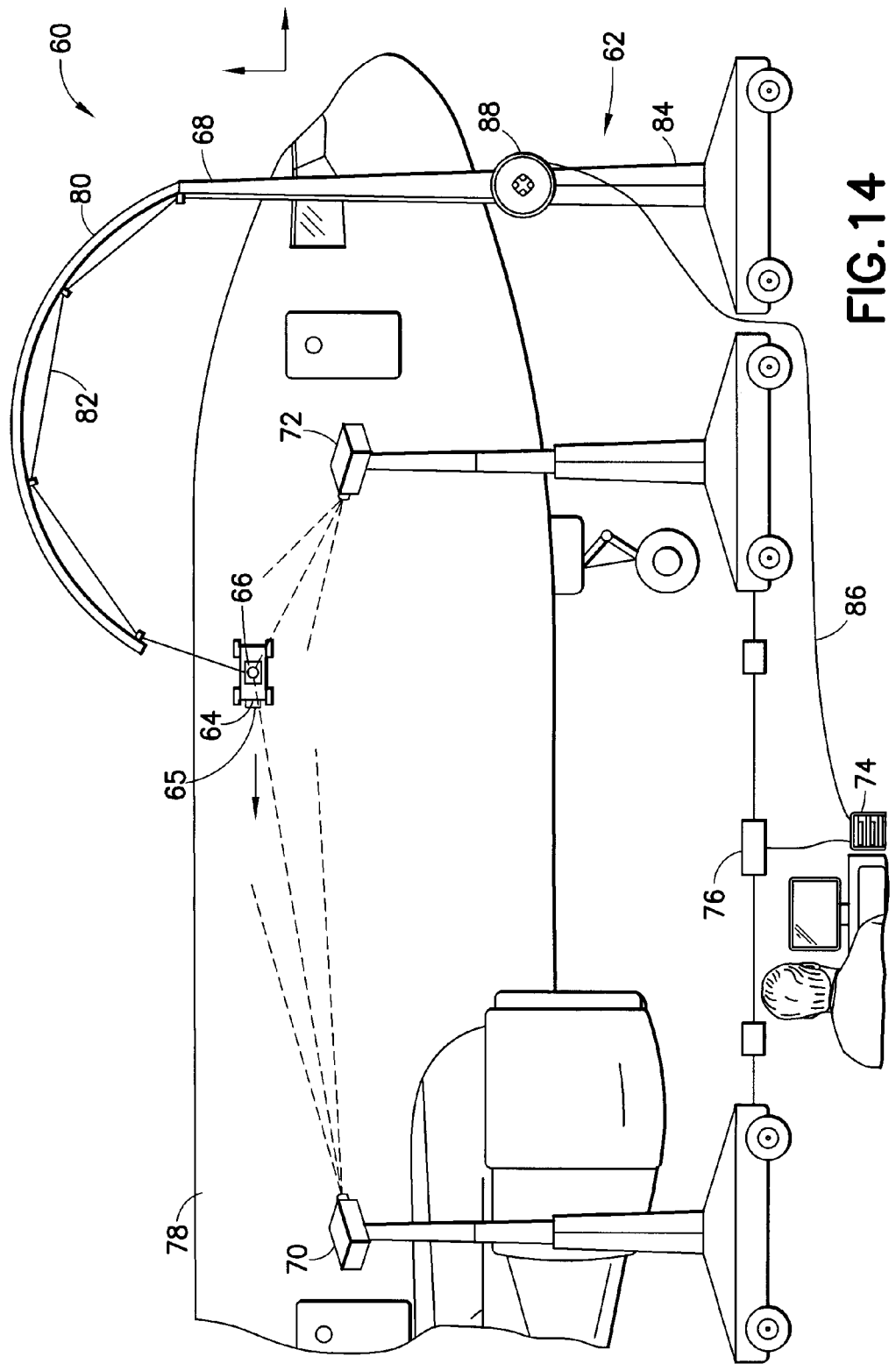
FIG. 14 is a diagram showing a system for inspecting the fuselage of an aircraft using a holonomic motion vehicle that carries a non-destructive inspection sensor or sensor array.

FIG. 14 shows an inspection environment 60 in which a non-destructive inspection system 62 employs a holonomic motion inspection vehicle 64 to inspect the fuselage 78 of an aircraft. The vehicle 64 carries a non-destructive inspection sensor or sensor array 65. As the vehicle travels over the surface of the fuselage 78, the sensor or sensor array 65 scans across the fuselage surface in search of anomalies or defects in a conventional manner.

The vehicle 64 further comprises a structure 66 that may have optical targets (not shown) attached to its surface and a connector (not shown) that secures the end of a flexible cable 82. The optical targets can be used in conjunction with position detection systems 70 and 72 to acquire data for use in determining the position and orientation of vehicle 64. Each position detection system 70, 72 may comprise a camera, a laser range meter and a pan-tilt unit, the functionality of such a position detection system having been previously described with reference to FIG. 12. The position detection systems 70, 72 send acquired data to a controller 74 via respective cables and a network switch 76. The controller 74 may comprise a computer or processor programmed to determine the position and orientation of inspection vehicle 64 based on the data received from the position detection systems.

The vehicle 64 is connected to a support system that comprises a cable 82 supported by a flexible boom 80. The flexible boom 80 is attached to a mobile frame 84. The cable 82 can be selectively played out from or wound on a reel 88, the amount of slack being maintained so that the cable will act as a tether to support the inspection vehicle 64 in the event that it releases from the fuselage surface. The cable 82 may further comprise lines for providing electrical power from a source (not shown) of electrical power on the ground to the stepper motors and electric ducted fans on inspection vehicle 64 and lines for communicating sensor data to controller 74 (via an electrical cable 86).

FIG. 15 shows components of a system for controlling movement of a holonomic motion crawler vehicle over a non-level surface in accordance with a further embodiment. A vehicle position controller 90 receives data representing the position and orientation of the vehicle from a position detection system 92 and data from sensor(s) 94. The sensor(s) 94 may, e.g., comprise an inclinometer that provides data representing the angle of inclination of the vehicle or respective sensors that provide data representing the loads on each wheel. The controller 90 processes that information to: (1) control the stepper motors 8 as a function of the position/orientation data and (2) control the electric ducted fans (EDFs) 10 as a function of the sensor data.

The crawler vehicle disclosed herein is a general-purpose motion platform that has many potential uses. Besides the NDI crawler application disclosed above, other tasks such as inspection, maintenance and painting could be accomplished with this type of system.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. A movable platform comprising:
a frame comprising first and second openings, and first and second bottom surfaces that partly define first and second suction zones respectively;
a plurality of wheels rotatably mounted to said frame, each wheel comprising a respective plurality of rollers having axes of rotation not parallel to an axis of rotation of said wheel;
a plurality of motors equal in number to the number of wheels, each motor being operable to drive rotation of a respective one of said wheels; and
first and second controllable suction devices respectively mounted adjacent to said first and second openings for producing respective suction forces in said first and second suction zones when said wheels are all in contact with a surface.

2. The platform as recited in claim 1, further comprising a controller programmed to independently control said plurality of motors and said first and second suction devices.

3. The platform as recited in claim 2, further comprising a sensor installed on said frame to measure the relative angle between said frame and a gravity vector, wherein said controller is programmed to control said first and second suction devices to produce respective suction forces that are a function of said relative angle.

4. The platform as recited in claim 2, further comprising a plurality of load sensors which detect respective normal forces being exerted on each wheel by a contacting surface, wherein said controller is programmed to control said first and second suction devices to produce respective suction forces that are a function of outputs from said load sensors.

5. The platform as recited in claim 1, wherein said first and second suction devices are respective electric ducted fans.

6. The platform as recited in claim 1, further comprising a tool mounted to said frame, said tool being selected from the following group: an eddy current sensor, an ultrasonic sensor, a camera, a painting tool, a laser marking system, and a robotic arm manipulator.

7. The platform as recited in claim 1, further comprising first through third low-surface-friction flexible skirts which are attached to and extend downward from said frame, said first suction zone being bounded on opposing sides by said first and second skirts, and said second suction zone being bounded on opposing sides by said second and third skirts.

8. The platform as recited in claim 1, wherein said frame further comprises third and fourth openings, and third and fourth bottom surfaces that partly define third and fourth suction zones respectively, said first through fourth suction zones being arranged in a square or rectangular array, the platform further comprising third and fourth suction devices respectively mounted adjacent to said third and fourth openings for producing respective suction forces in said third and fourth suction zones when said wheels are all in contact with a surface.

9. A system for moving a tool or sensor over a non-level surface, comprising a platform and a controller,
wherein said platform comprises:
a frame comprising first and second openings, and first and second bottom surfaces that partly define first and second suction zones respectively;
a plurality of wheels rotatably mounted to said frame, each wheel comprising a respective plurality of rollers having axes of rotation not parallel to an axis of rotation of said wheel;
a plurality of motors equal in number to the number of wheels, each motor being operable to drive rotation of a respective one of said wheels; and
first and second controllable suction devices respectively mounted adjacent to said first and second openings for producing respective suction forces in said first and second suction zones when said wheels are all in contact with the non-level surface, and
wherein said controller is programmed to independently control said plurality of motors and said first and second suction devices.

10. The system as recited in claim 9, further comprising a sensor installed on said frame to measure the relative angle between said frame and a gravity vector, wherein said controller is programmed to control said first and second suction devices to produce respective suction forces that are a function of said relative angle.

11. The system as recited in claim 9, further comprising a plurality of load sensors which detect respective normal forces being exerted on each wheel by a contacting surface, wherein said controller is programmed to control said first and second suction devices to produce suction forces that are a function of outputs from said load sensors.

12. The system as recited in claim 9, wherein said first and second suction devices are respective electric ducted fans.

13. The system as recited in claim 9, further comprising a tool mounted to said frame, said tool being selected from the following group: an eddy current sensor, an ultrasonic sensor, a camera, a painting tool, a laser marking system, and a robotic arm manipulator.

14. The system as recited in claim 9, wherein said frame further comprises third and fourth openings, and third and fourth bottom surfaces that partly define third and fourth suction zones respectively, said first through fourth suction zones being arranged in a square or rectangular array, the platform further comprising third and fourth suction devices respectively mounted adjacent to said third and fourth openings for producing respective suction forces in said third and fourth suction zones when said wheels are all in contact with a surface.

15. The system as recited in claim 9, further comprising a cable connected to said platform, wherein said motors and said suction devices receive electrical power via said cable.

16. The system as recited in claim 9, further comprising a cable connected to said platform, wherein said controller sends control signals to said motors via said cable.

17. A method for scanning a tool or sensor across a non-level surface, comprising:
(a) placing the wheels of a tool- or sensor-carrying holonomic motion vehicle in contact with a non-level surface to be scanned;
(b) producing suction forces which hold the wheels of the holonomic motion vehicle in contact with the non-level surface;
(c) activating the tool or sensor while step (b) is being performed; and
(d) controlling the rotation of the wheels to cause the vehicle to move along a path relative to the non-level surface while steps (b) and (c) are being performed.

18. The method as recited in claim 17, further comprising measuring the relative angle between a frame of the vehicle and a gravity vector, wherein step (b) comprises producing a first suction force in a first suction zone and a second suction force in a second suction zone, the first and second suction forces having a difference in magnitude which is a function of said relative angle measurement.

19. The method as recited in claim 17, further comprising measuring the normal forces being exerted on each wheel of the vehicle by the contacting surface, wherein step (b) comprises producing a first suction force in a first suction zone and a second suction force in a second suction zone, the first and second suction forces having a difference in magnitude which is a function of said normal force measurements.

20. The method as recited in claim 17, wherein the holonomic motion vehicle carries a sensor or sensor array that scans the non-level surface as the holonomic motion vehicle moves and produces electrical signals indicative of the integrity of the structure at and/or below the non-level surface.

* * * * *